United States Patent

[11] 3,617,926

[72] Inventor Henry W. Bullinger
 Wilton, Conn.
[21] Appl. No. 764,663
[22] Filed Oct. 3, 1968
[45] Patented Nov. 2, 1971
[73] Assignee The Perkin-Elmer Corporation
 Norwalk, Conn.

[54] LASER USING A CUBE CORNER REFLECTOR AT ONE END OF THE DISCHARGE TUBE SO THAT BOTH CAVITY REFLECTORS ARE AT THE OTHER END TO COMPENSATE FOR THERMAL DISTORTION
7 Claims, 5 Drawing Figs.

[52] U.S. Cl. .................................................. 331/94.5
[51] Int. Cl. .................................................. H01s 3/05
[50] Field of Search ......................................... 331/94.5;
 332/7.5

[56] References Cited
UNITED STATES PATENTS

| | | | |
|---|---|---|---|
| 3,327,243 | 6/1967 | Stickley | 331/94.5 |
| 3,492,599 | 1/1970 | Rigrod | 331/94.5 |
| 3,440,563 | 4/1969 | Clement | 331/94.5 |
| 3,447,098 | 5/1969 | Eckberg | 331/94.5 |

Primary Examiner—Ronald L. Wibert
Assistant Examiner—Edward S. Bauer
Attorney—Edward R. Hyde, Jr.

ABSTRACT: This laser light source includes an optical resonator cavity having first and second resonant cavity reflective surfaces positioned near a first output window of a laser discharge tube and a third reflective means comprising a corner cube positioned adjacent a second output window of the discharge tube. The corner cube is adapted for laterally translating and reflecting an output light beam from the discharge tube to the second cavity reflective surface.

PATENTED NOV 2 1971 3,617,926
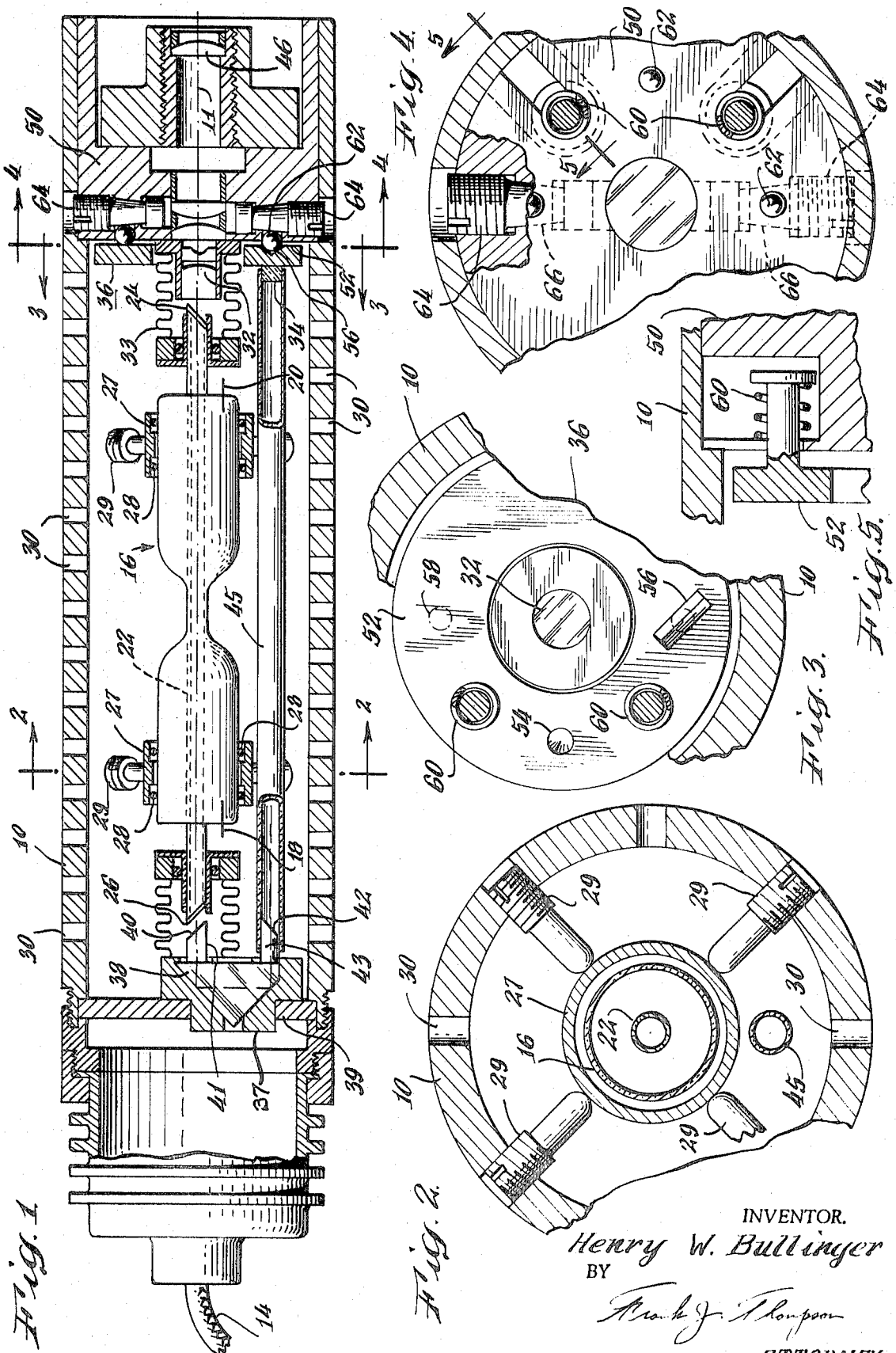
INVENTOR.
Henry W. Bullinger
BY
Frank J. Thompson
ATTORNEY.

LASER USING A CUBE CORNER REFLECTOR AT ONE END OF THE DISCHARGE TUBE SO THAT BOTH CAVITY REFLECTORS ARE AT THE OTHER END TO COMPENSATE FOR THERMAL DISTORTION

This invention relates to laser light sources. The invention relates more particularly to alignment apparatus utilizing a laser light source.

Laser light sources are frequently employed in optical alignment or tooling apparatus because of the rectilinear characteristics exhibited by a propagating laser light beam. The beam which functions as a reference line substantially increases the accuracy with which an alignment operation can be accomplished relative to prior optical alignment arrangements.

A gas laser employed in alignment apparatus includes an optical resonant cavity having a discharge or plasma tube containing a gaseous mixture as well as cavity reflecting surfaces positioned near exit windows at opposite ends of the discharge tube. The resonant cavity is mounted in an elongated support housing in a manner for providing that a laser beam thereby generated is, within engineering limitations, parallel to and coincident with a reference line extending through the length of the housing. For example, when a tubular-shaped housing is utilized, this reference line can comprise the longitudinal axis of the housing. Setup of the laser for an alignment operation is accomplished by then properly positioning the reference line of the housing with respect to some object or plane. The accuracy of alignment is thus limited by lateral and angular deviation of the center of the laser light beam from the reference line.

A laser apparatus of the type described is at times subjected to relatively severe environmental conditions, and, to heat generated by the laser itself which adversely alters the initial positioning of the laser beam with respect to the reference line of the housing. The reflective surfaces of the resonant cavity are supported by the housing at spaced apart positions of the cavity. In this arrangement, the thermal capacity as well as the coefficient of linear expansion of the housing and the separate mounts for the reflective surfaces can differ. Although means are provided for ventilation of the housing, thermal gradients are developed along its length and a resulting torsional force acts upon the housing. The reflective surfaces which are spaced apart along the length of the housing are then subjected to a relative motion which causes both a lateral and an angular displacement of the laser beam from the reference line. Although the motion of these surfaces is relatively slight, the effect upon beam displacement is pronounced. This deviation is particularly pronounced when the laser apparatus utilizes a magnifying collimating lens.

In view of this beam displacement, use of the apparatus must be delayed until the expiration of a stabilizing warm-up period. The warm-up period is generally on the order of one-half hour. However, this procedure is wasteful of time and unduly restricts the use of the apparatus when several alignments are to be performed.

Accordingly, it is an object of the invention to provide an improved laser alignment apparatus.

Another object of the invention is to provide a laser alignment apparatus which reduces deviation between the laser beam and a reference line of the apparatus.

A further object of the invention is to provide a laser device adapted for reducing displacement of the laser beam with variations in temperature.

In accordance with general features of this invention, a laser light source includes an optical resonator cavity having first and second resonant cavity reflective surfaces positioned near a first output window of a laser discharge tube and a third reflective means comprising a corner cube positioned adjacent a second output window of the discharge tube. The corner is adapted for laterally translating and reflecting an output light beam from the discharge tube to the second cavity reflective surface.

In accordance with a particular embodiment of the present invention, the laser light source includes an optical resonant cavity positioned in a laser housing and having a first cavity reflective surface supported by the housing adjacent an output window of the discharge tube. A second cavity reflective surface is supported by the housing and is positioned laterally apart from and adjacent to the first cavity reflective surface. A third reflective means which is adapted for laterally translating a laser beam being generated and reflecting the beam toward the second cavity reflective surface is supported by the housing adjacent a second output window of the discharge tube. Through this folded beam arrangement, the cavity reflective surfaces are located in relatively close proximity, and are thus maintained under substantially the same environmental condition and subjected to a small relative motion. Although the housing can experience a torsional force and the third reflective means will be subject to a relative motion with respect to the cavity surfaces, the optical characteristics of the third reflective means maintains the laser beam reflected thereby substantially parallel and coincident with its initial position.

These and other objects and features of the invention will become apparent with reference to the following specifications and the drawings, wherein:

FIG. 1 is a sectional view of a laser alignment apparatus fabricated in accordance with features of this invention;

FIG. 2 is a sectional view taken along line 2—2 of FIG. 1;

FIG. 3 is a sectional view taken along line 3—3 of FIG. 1 and illustrating a kinematic mounting means;

FIG. 4 is a sectional view taken along line 4—4 of FIG. 1 illustrating a kinematic mounting means; and FIG. 5 is a view taken along line 5—5 of FIG. 4 illustrating a spring retaining arrangement for the kinematic mount of FIG. 1.

Referring now to FIG. 1, a laser device is shown having a generally tubular-shaped relatively heavy gauge aluminum housing 10 for supporting an optical resonant cavity. A reference axis for the device comprises a longitudinal axis 11 of the housing. This axis is utilized in setup of the laser device during an alignment operation. Operation of the laser occurs in the visible light spectrum and the resonant cavity includes a plasma or discharge tube 16 containing a gas mixture such as helium-neon. Discharge is initiated and maintained therein by DC pumping and electrical energy is supplied to the tube through an anode electrode 18 and a cathode electrode 20. For purposes of clarity in the drawing the source of operating potential and the particular electrical connections between an electric power input cable 14 and the electrodes 18 and 20 is not illustrated. A capillary tube 22 is positioned within the discharge tube 16 and the lasing action is confined to the area of this capillary tube. A Brewster window 24 is provided as a first output window for the discharge tube at one end thereof and a Brewster window 26 is provided as a second output window at an opposite end thereof. The discharge tube 16 is mounted in the housing 10 by metal support rings 27 extending about the tube and spaced therefrom by "O" rings 28. Adjustable mounting screws 29 provide for adjustment of the tube 16 in the housing 10. During the lasing operation the discharge tube generates heat and increases the temperature within the housing. Temperature gradients can therefore exist along the length of the housing. A plurality of apertures 30 are provided in the housing for ventilating the interior of the housing in order to reduce the temperature gradients.

The resonant cavity in addition to the discharge tube 16 further includes a first cavity reflective surface comprising a partially transmissive dumper mirror 32 positioned near the first output window 24. A bellows 33 is provided for light and dust shielding. A second cavity reflective surface 34 is also positioned near the first output window and is laterally spaced from the dumper mirror 32. In one arrangement, the reflective surface 34 is a plane mirror having a high reflectivity dielectric coating while the dumper mirror 32 comprises a spherically shaped partially transmissive mirror having a dielectric coating. The dumper mirror 32 is aligned with the axis of the discharge tube 16 while the plane mirror 34 is supported in a kinematic mount 36 which is described in detail hereinafter.

These mirrors form a hemiconfocal optical resonant cavity for the laser device.

A third reflective means comprising a corner cube prism 38 is positioned near the second output window 26 and is adapted for laterally translating the laser beam and reflecting the beam at output window 26 toward the plane mirror 34. The corner cube 38 is a four-sided polyhedron formed by three mutually perpendicular optical planes and a fourth plane which is oblique to each of the other three. The corner cube as used in the specifications and claims refers to this form of prism and further includes those prisms referred to as corner reflectors, trihedral reflectors, and "cat's eye" reflectors. It is a characteristic of this form of reflector that the reflected beam is maintained parallel to the incident beam when variations in the angle of incidence in any of three mutually perpendicular planes occur. The corner cube 38 is nested in a member 37 which is supported in the housing 10 by a suitable mount 39 formed of aluminum or other metal similar to that of the housing and having a similar coefficient of expansion. A Brewster window 40 and a Brewster window 42 are provided for the corner cube 38. These windows are provided on tubular members 41 and 43 which are formed of an optical quality glass ground to the desired Brewster angle and secured to the corner cube 38 by a suitable adhesive. A bellows 44 provides dust and light shielding for the prism and Brewster windows 26 and 40. The laser beam transmitted between the mirror 34 and Brewster window 42 traverses a path which is enclosed by an opaque tubular body 45 which similarly functions both as a dust cover and light shield. The laser beam which is transmitted by the dumper mirror 32 is magnified and collimated by a lens assembly 46.

As indicated hereinbefore UHR mirror 34 is mounted on a kinematic mount 36 for providing adjustment thereof. The kinematic mount includes a stationary body 50 mounted to the housing 10 and a body 52 which is adjustable with respect to the body 50. As illustrated in FIG. 1, the mirror 34 is supported on the body 52 and is adjustable therewith. The body 52 includes a conical groove 54, a V-shaped groove 56 and a flat surface identified as 58 in FIG. 3 which represent the three-mounting points for the body 52. Spring biasing means 60, best seen in FIG. 5, operate to provide a force biasing the body 52 toward the body 50. A hardened ball 62 is positioned at the support points 54, 56 and 58 and abuts adjusting screws 64, which extend into the body 50 in a radial direction. As shown in FIGS. 1 and 4, the screws 64 include a tapered segment 66 making contact with the hardened balls 62. Radial adjustment of the screws 64 thereby effects movement of the hardened balls 62 and corresponding movement of the body 52. A feature of this kinematic mount is the inclined segment 66 which in conjunction with the threading portions of the screws provides relatively accurate adjustment for the kinematic mount while eliminating the use of a relatively high number of threads per inch on the screws.

As indicated hereinbefore thermal gradients exist along the length of the housing 10. The laser arrangement of the present invention advantageously reduces the effects of distortion in the housing 10 in that the corner cube 38 exhibits optical characteristics for reflecting a beam at the UHR mirror 34 parallel to the incident beam at window 40 which is substantially independent of motion of the reflector 38, and similarly provides an output beam at Brewster window 40 parallel to the incident beam at window 42 which is independent of motion of the reflector 38. Thus, while a torsional force may cause a movement of the corner cube 38, the reflected laser beam will not be substantially translated from its initial path. Furthermore, the positioning of the cavity reflective surfaces 32 and 34 in relative proximity subjects these surfaces to substantially the same environmental conditions and relative motion between surfaces in therefore substantially reduced. As a result, the laser output beam experiences only a relatively small deviation laterally and angularly from an initial position with respect to the reference axis 11 when distortions in the housing occur.

An improved laser device has thus been described which advantageously reduces the deviations of the output laser beam with respect to an axis of the device when the laser is subjected to varying environmental conditions.

While I have illustrated and described a particular embodiment of my invention, it will be understood that various modifications may be made therein without departing from the spirit of the invention and the scope of the appended claims.

I claim:
1. A laser device comprising:
   an elongated housing for a laser device;
   an optical resonant cavity including a discharge tube, first and second cavity reflective surfaces, and a third reflective means positioned within said housing, said discharge tube having output windows at oppositely disposed ends of the tube;
   said discharge tube dissipating energy in operation resulting in a transfer of thermal energy to said housing and thereby causing relative movement between portions of the housing;
   means supporting said first and second cavity reflective surfaces within the housing near an output window at one end of the discharge tube for providing that said first and second reflective surfaces are subjected to a same positional deviation as a result of the relative movement of said housing; and,
   said third reflective means mounted at another end of said discharge tube adjacent the other of said output windows for laterally translating and reflecting an output light beam from said adjacent window toward said second reflective surface, said third reflective means adapted for reflecting the beam from said second reflective surface in a direction parallel to the output beam which is transmitted through said first reflective surface when a positional deviation between the discharge tube and third reflective means occurs.

2. The device of claim 1 wherein said third reflective means comprises a corner cube.

3. The device of claim 2 wherein said first reflective surface comprises a dumper mirror and is axially aligned with an output window of the laser.

4. The device of claim 3 wherein said first nd second reflective surfaces are each supported by bodies which are closely thermally coupled.

5. The device of claim 4 including means for altering the position of said second reflective cavity surface support body.

6. The device of claim 5 wherein said housing comprises a tubular body formed of metal.

7. A laser device comprising:
   an elongated housing having an axis thereof and subject to a torsion when a thermal gradient exists along its length;
   an optical resonant cavity having a discharge tube including oppositely disposed output windows;
   a means including a fixed and a kinematic mount for supporting reflective surfaces positioned in said housing adjacent a first of said output windows, said reflective surfaces forming an optical resonant cavity for said laser;
   the first of said reflective surfaces being a dumper mirror supported by said fixed mount and aligned axially with said output window;
   the second of said reflective surfaces being a reflective mirror supported by said kinematic mount and positioned laterally adjacent said dumper mirror; and,
   a corner cube mounted in said housing adjacent a second of said output windows and adapted for laterally translating and reflecting an output light beam from said adjacent window toward said second reflective surface.

* * * * *